(No Model.)
J. F. THEURER.
APPARATUS FOR CHARGING LIQUIDS WITH CARBONIC ACID.
No. 519,140. Patented May 1, 1894.
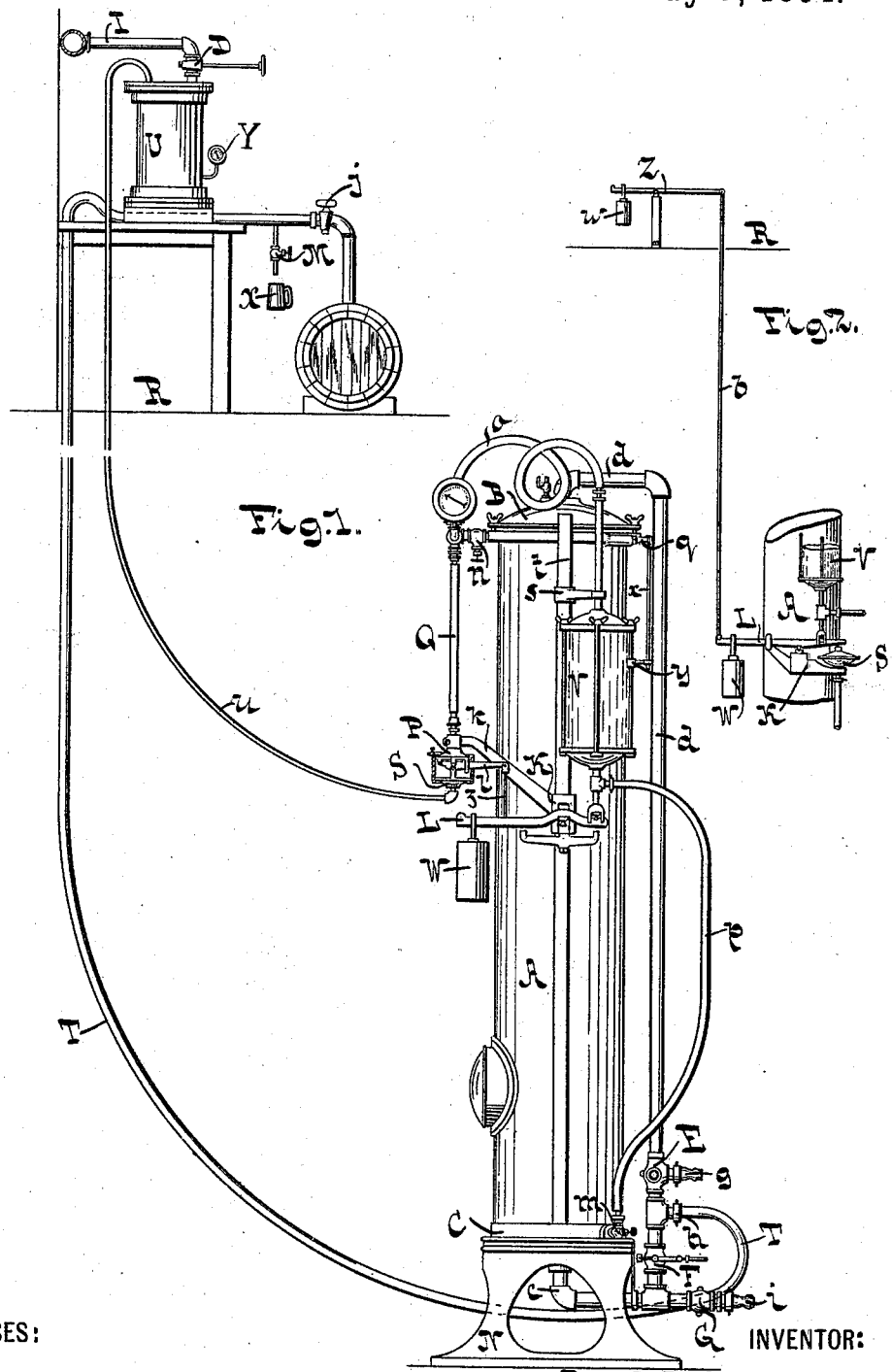
WITNESSES:
INVENTOR:
Jacob F. Theurer,
BY
ATTORNEY

UNITED STATES PATENT OFFICE.

JACOB F. THEURER, OF MILWAUKEE, WISCONSIN, ASSIGNOR TO THE UNIVERSAL CARBONATING COMPANY, OF NEWARK, NEW JERSEY.

APPARATUS FOR CHARGING LIQUIDS WITH CARBONIC ACID.

SPECIFICATION forming part of Letters Patent No. 519,140, dated May 1, 1894.

Application filed February 5, 1894. Serial No. 499,141. (No model.)

*To all whom it may concern:*

Be it known that I, JACOB F. THEURER, a citizen of the United States of America, and a resident of Milwaukee, in the county of Milwaukee and State of Wisconsin, have invented certain new and useful Improvements in Apparatus for Charging Liquids with Carbonic Acid, of which the following is a specification.

My invention relates to improvements in apparatus for charging liquids with carbonic acid, and especially to apparatus of the character described and shown in United States Letters Patent No. 512,070, granted January 2, 1894, to the Universal Carbonating Company, assignee. It has for its object to provide additional means for properly regulating the impregnation.

Beer to be charged with carbonic acid, previously to being racked into kegs for delivery to the consumer, is not always delivered to the charger in the same condition with reference to the amount of carbonic acid already contained therein, and to obtain the desired uniform degree of impregnation, it becomes necessary to re-adjust the level of liquid in the charger and its regulating vessel,—which adjustment is made by shifting the sliding weight on the lever supporting the regulating vessel which operates the gas supply valve. This heretofore has been done by the operator near the charger, while the object of my present invention is to enable the filler at the racking cocks, who generally is at a considerable distance from the charger, to effect this adjustment.

The nature of my invention will best be understood when described in connection with the annexed drawings, in which—

Figure 1 is an elevation of an automatic regulating apparatus such as referred to in United States Letters Patent No. 512,070, provided with my improved means for adjusting the liquid level in the charger and regulator from the racking floor. Fig. 2 shows a modification of the same, drawn to a smaller scale.

Referring now to Fig. 1, the letter A designates a stationary charging vessel supported on a frame N; V an external regulating vessel resting upon a scale beam L and connected at the top with the top of the charger A by a tube $o$, and at the bottom with the bottom of the charger A by a hose $p$; $n$ and $m$ are valves for connecting the tube $o$ and hose $p$ with the charger A.

P is a diaphragm apparatus supported on an arm $k$ on bracket K, which latter supports the scale beam L. The chamber of the diaphragm apparatus P is connected with the top of the charger A and with the top of the regulating vessel V by the pipe Q, tube $o$ and valve $n$, while the diaphragm bears on a lever $l$ with link $z$ bearing on scale beam L, so as to transmit to the vessel V an upward thrust proportional to the gas pressure in the charger.

W is a sliding weight on the scale beam L.

The top and bottom of the charger A are connected by a pipe $d$ provided with valves E, F and G.

$g$ is a hose connection for the supply of uncharged liquid, $h$ a coupling for the hose T leading to the racking cocks $j$.

$i$ is a hose connection for water, R, the racking floor.

M is a test faucet and X a glass into which the filler occasionally draws beer to enable him to see if the beer is impregnated to the proper degree.

To enable the filler to adjust the levels of fluid in the charger A and in the regulating vessel V, without moving the sliding weight W, I provide a diaphragm apparatus S, the diaphragm of which acts upon the lever $l$ in opposite direction to that of the diaphragm apparatus P, and the chamber of which is connected to a receiver U for compressed air or gas by a tube $u$. The receiver U, I place upon, or near, the bench at which the filler stands. Compressed air or gas from any suitable source is admitted into this receiver U from a pipe I through a three way cock D, which latter also serves for discharging air from the receiver. In place of a three way cock, two separate cocks or valves may be used.

Y is a pressure gage attached to the receiver.

Whenever it is desired to increase the degree of impregnation the filler turns the handle of the cock D so as to increase the pressure in the receiver U. The increased pressure is communicated to the diaphragm apparatus S and the pressure on the levers $l$ and L reduced, requiring a smaller column in the regulating vessel V, and in a corresponding degree reducing the liquid level in the charger A without change in the gas pressure, so that now, with the same gas pressure as before, the liquid entering the charger falls through an increased height and becomes impregnated to a higher degree. By turning the three way cock D so as to allow some of the gas in the receiver U to escape, a contrary effect is produced,—the level of liquid in the charger is raised and the degree of saturation thereby reduced. When first adjusting the apparatus the pressure in the receiver U is set at say 5 pounds, the pressure of supply being higher, say about 10 pounds.

While I prefer the pneumatic apparatus shown and described for the purpose of varying the upward thrust imparted to the regulating vessel V by the automatic regulating apparatus shown and described in my former patent,—other means may be used,—for instance—such as shown in Fig. 2, where L is the scale beam, W, the sliding weight, V, the regulating vessel, and Z, a lever supported upon a standard on the racking floor, said lever Z being connected by suitable means such as the rod b with the scale beam L and provided with a sliding weight w.

What I claim as new, and desire to secure by Letters Patent, is—

1. In a carbonic acid charger, a fluid regulating device automatically operated from the charger, combined with an auxiliary regulating device acting in opposite direction to the primary regulating device, and operative connections between the auxiliary regulating device and a distant station, substantially as described.

2. In a carbonic acid charger of the character specified, the combination with the automatic regulating device, of a regulating apparatus such as described operated from the racking floor, connected with the scale beam and adapted to vary the effective thrust of the scale beam by the hand of the operator, substantially as described.

3. In a carbonic acid charger of the character specified, the combination with the automatic regulating device, of a diaphragm apparatus connected to the scale beam of the automatic regulating device, a receiver adapted to hold gas under pressure connected by a tube with the chamber of the diaphragm apparatus, a supply pipe for compressed gas connected to the receiver and provided with means for admitting gas to the receiver and for discharging it therefrom, substantially as described.

4. In combination with the charger A, regulating vessel V, scale beam L, diaphragm apparatus P and connections, of a diaphragm apparatus S, gas receiver U connected to the chamber of the diaphragm apparatus S by a tube u, a pressure gage B, a supply pipe I for compressed gas, and means for admitting gas to the receiver and for discharging it therefrom, substantially as described.

In testimony that I claim the foregoing as my invention I have signed my name, in presence of two witnesses, this 26th day of January, 1894.

JACOB F. THEURER.

Witnesses:
EMIL BEST,
FRED. RUENZEL.